United States Patent [19]

Burns, Jr.

[11] Patent Number: 5,333,805
[45] Date of Patent: Aug. 2, 1994

[54] WOUND SPOOL OF WEB MATERIAL

[75] Inventor: Donald W. Burns, Jr., Henrietta, N.Y.

[73] Assignee: Eastman Kodak Company, Rochester, N.Y.

[21] Appl. No.: 898,113

[22] Filed: Jun. 12, 1992

[51] Int. Cl.⁵ ............................................. B65H 75/18
[52] U.S. Cl. ................................. 242/160.3; 242/613.1
[58] Field of Search ...................... 242/71, 71.1, 71.2, 242/71.3, 71.4, 71.5, 71.6, 71.7, 71.8, 74; 354/275

[56] References Cited

U.S. PATENT DOCUMENTS

| | | |
|---|---|---|
| 1,672,510 | 6/1928 | Williams . |
| 1,930,144 | 10/1933 | Lee ........................................ 242/74 |
| 2,017,160 | 10/1935 | Parker ..................................... 242/71 |
| 2,019,672 | 11/1935 | Goodhand ............................ 206/52 |
| 2,182,398 | 12/1939 | Gantnier ............................. 242/71.8 |
| 2,362,577 | 11/1944 | Mihalyi et al. ..................... 242/71.8 |
| 2,541,476 | 2/1951 | Mihalyi ............................... 242/71.1 |
| 2,729,401 | 1/1956 | Italiano .............................. 242/71.1 |
| 3,021,085 | 2/1962 | Freer ..................................... 242/74 |
| 3,300,156 | 1/1967 | Tucker et al. ....................... 242/74.1 |
| 3,361,380 | 1/1968 | Mizutani ............................... 242/74 |
| 3,485,690 | 12/1969 | Kozai ..................................... 156/73 |
| 4,225,097 | 9/1980 | Ohtomo ............................ 242/55.01 |
| 4,506,843 | 3/1985 | Lührig et al. ....................... 242/74 |
| 4,834,310 | 5/1989 | Ikariya et al. ...................... 242/74 |
| 4,846,418 | 7/1989 | Fairman ............................. 242/71.1 |
| 4,852,821 | 8/1989 | Harris et al. ...................... 242/71.8 |
| 4,978,084 | 12/1990 | Harris et al. ........................ 242/74 |
| 5,004,176 | 4/1991 | Niedospial ..................... 242/71.8 X |
| 5,031,853 | 7/1991 | Jensen ............................... 242/71.1 |

FOREIGN PATENT DOCUMENTS 53312 6/1982 European Pat. Off. ........... 242/71.1

Primary Examiner—Daniel P. Stodola
Assistant Examiner—Eileen A. Dunn
Attorney, Agent, or Firm—Charles E. Snee, III

[57] ABSTRACT

A spool (10) for a strip (24) of web material such as a photographic film strip of the type having a lead end (26), the spool including a core (12) to which the lead end is attached, a pair of radially extended end flanges (18) at respective opposite ends of the core and a pair of circumferentially and axially extended shoulders (16) between the end flanges and the core for supporting at least a portion of the longitudinally extending edges of the lead end. Each of the shoulders has an axially extended frusto-conical portion adjacent to and extended from the end flange to the core for supporting one of the edges of the lead end; the axial length ($l_3$) and cone angle ($\phi$) of each frusto-conical portion being sufficient for winding the lead end about the frusto-conical portions and for permitting the first convolution of the film strip to bow inwardly toward the core, thereby radially spacing the second convolution from the first convolution and a strip of tape (22) attaching the lead end to the core.

2 Claims, 2 Drawing Sheets

WOUND SPOOL OF WEB MATERIAL

DESCRIPTION

1. Technical Field

The invention concerns spools for strips of web material. More particularly, the spool according to the invention is suited for web materials such as photographic films which have a lead end suitably attached to the core of the spool.

2. Background Art

When winding strips of web materials onto spools, a common practice has been to attach the lead end of the strip to the core of the spool by means such as a strip of tape between the lead end and the core or by means of a mechanical engagement between the lead end and the core. For many types of web materials, contact with the strip of tape or deformations in the web due to the mechanical engagement can cause the first few convolutions of the web material to be deformed slightly and to exhibit pressure marks. These marks may be so prominent as to be unsightly for some web materials, but may also be quite subtle in appearance. Where the web material is photographic film, such pressure marks have long been known to cause defects in the images produced in the film over the first few convolutions, an unacceptable situation for photographers. Contact with the tape can also cause abrasion marks and transfer of dirt from the tape to the photographic film, each of which can lead to irregularities in the processed film.

Various techniques have been tried to space the second convolution of a strip of web material from the underlying strip of tape or deformation of the first convolution, in order to reduce pressure marking, abrasion and transfer of dirt. U.S. Pat. No. 1,672,510 shows a spindle for winding a strip of gelatin in which the center of the spindle has a reduced diameter portion to permit winding of a narrow leader for the strip without creating a bulge in the successive convolutions of the strip. U.S. Pat. No. 1,930,144 shows a spool for photographic film in which the ends of the core of the spool are provided with axially extending shoulders between which a reduced diameter portion is formed for receiving at least a portion of the first convolution of film.

While spindles or spools of these general types have been widely used, the advent of more pressure sensitive web materials, such as certain state of the art photographic films, has brought a need for spools or lead end geometries, or both, which are configured to further minimize any tendency to produce pressure marks. This is because the light sensitive emulsions used in modern photographic films are susceptible to pressure marking due to smaller deformations and slighter pressures than could be withstood by previous films.

SUMMARY OF THE INVENTION

A wound spool in accordance with the invention includes a film strip of the type having a lead end. The spool includes a core to which the lead end is attached, a pair of radially extended end flanges at respective opposite ends of the core and a pair of circumferentially and axially extended shoulders between the end flanges and the core for supporting at least a portion of the longitudinally extending edges of the lead end. In accordance with the improvement of the invention, each of the shoulders comprises an axially extended frusto-conical portion adjacent to and extended from the end flange to the core, each shoulder being for supporting one of the edges of the lead end. The axial length and cone angle of each frusto-conical portion are chosen to be sufficient for winding the lead end about the frusto-conical portions and for permitting the first convolution of the lead end to bow radially inwardly toward the core, thereby radially spacing at least the central portion of the first convolution from the second convolution and preventing contact which could lead to pressure marking, abrading or transferring of dirt. Although straight sided frusto-conical portions are preferred, the use of radially inwardly or outwardly curved, essentially frusto-conical portions is also within the scope of the invention; so long as the shape of the shoulder permits the first convolution to bow inwardly enough to avoid substantial contact with the second convolution. The lead end may be attached to the core by a strip of tape extending around the core between the shoulders and engaging both sides of the lead end, in which case the axial length and cone angle are chosen to be sufficient for radially spacing the second convolution from contact with the first convolution and the strip of tape. The use of other modes of attachment for the lead end is also within the scope of the invention.

DESCRIPTION OF THE PREFERRED EMBODIMENTS

Figure 1:
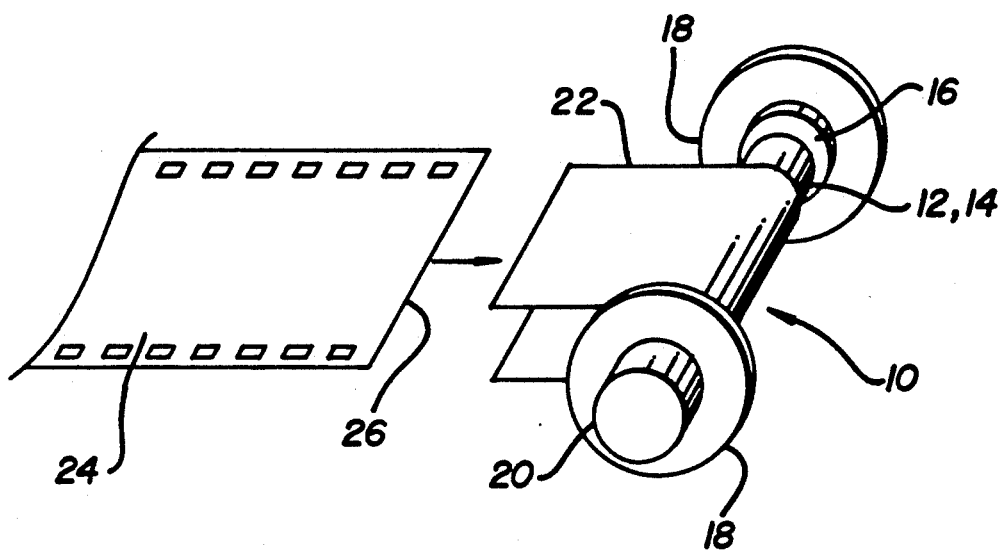
FIG. 1 shows a perspective view of a spool with a strip of tape wrapped partially around the core and the lead end of a strip of photographic film being inserted between the ends of the strip of tape.

The following is a detailed description of the preferred embodiments of the invention, reference being made to the drawings in which the same reference numerals identify the same elements of structure in each of the several Figures.

FIG. 1 illustrates schematically how a spool 10 according to the invention may be attached to the lead end of a strip of web material such as photographic film. Spool 10 may be injection molded from a suitable plastics material or manufactured in accordance with any other process and from any suitable material. In the typical manner as further illustrated in FIGS. 2 and 3, spool 10 comprises an essentially cylindrical central core 12 to which the lead end is attached and about which the strip is wound. The axial length $l_1$ of core 12 preferably is only slightly longer than the width of the strip. A central portion 14 of core 12 has a length $l_2$ and diameter $d_1$. At the opposite ends of central portion 14 are circumferentially and axially extended shoulders 16, each of which comprises an axially extended frusto-conical portion having a large diameter $d_2$ near the end of core 12, a smaller diameter $d_3$ near the end of central portion 14, an axial length $l_3$ and a cone angle $\phi$. Although $d_1$ is illustrated as being slightly smaller than $d_3$, the two diameters may be equal without departing from the scope of the invention. Also, though straight sided frusto-conical shoulders 16 are preferred, the surface of shoulders 16 may also be curved radially inwardly or outwardly from $d_2$ to $d_3$. Shoulders 16 function to support the marginal edges of the strip in a manner unique to the invention, as will be described subsequently. Formed integrally with core 12 adjacent shoulders 16 are a pair of radially extended end flanges 18 to prevent telescoping of the strip from core 12. Finally, at each end of spool 10 is formed an axially extended boss or hub 20 which cooperates in the known manner with apparatus for winding a strip onto the spool, with the camera in which a spool of photographic film is used and with apparatus for processing exposed film.

Figure 3:
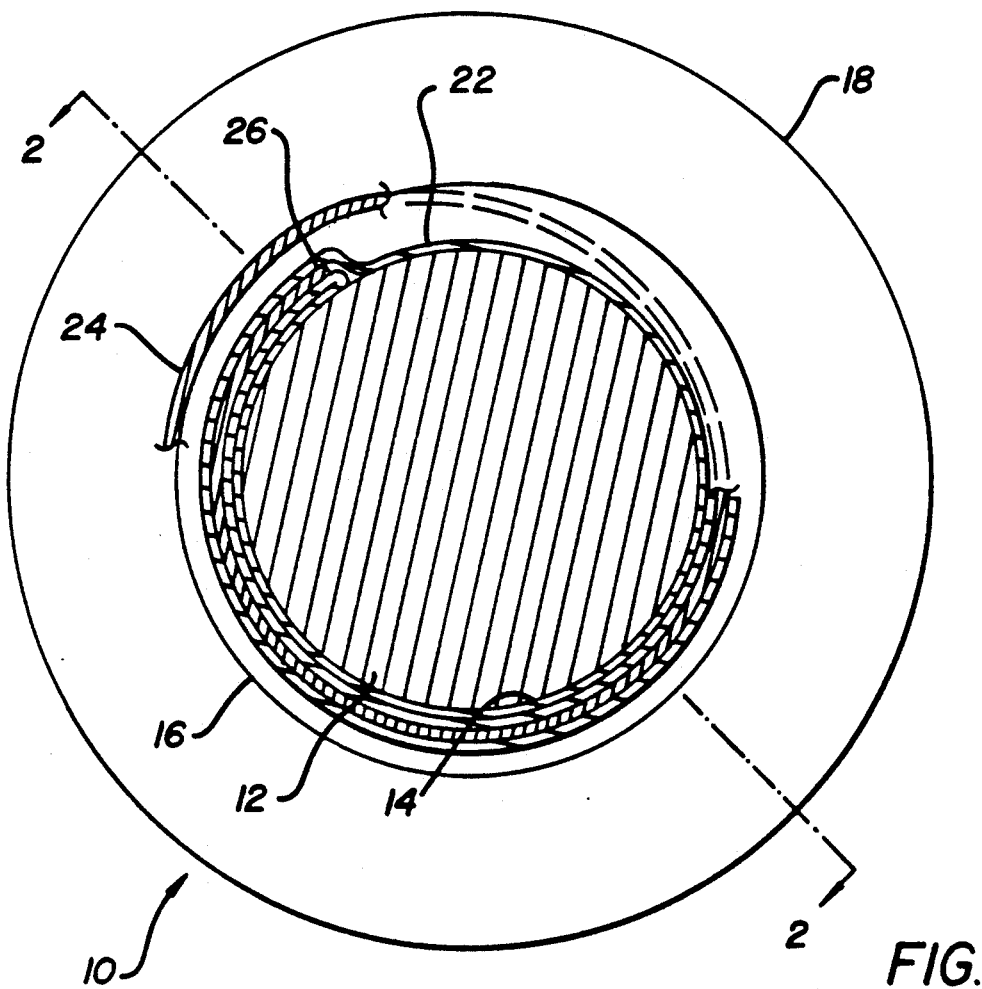
FIG. 3 shows a sectional view of a spool in accordance with the invention, taken along line 3—3 of FIG. 2.
Figure 2:
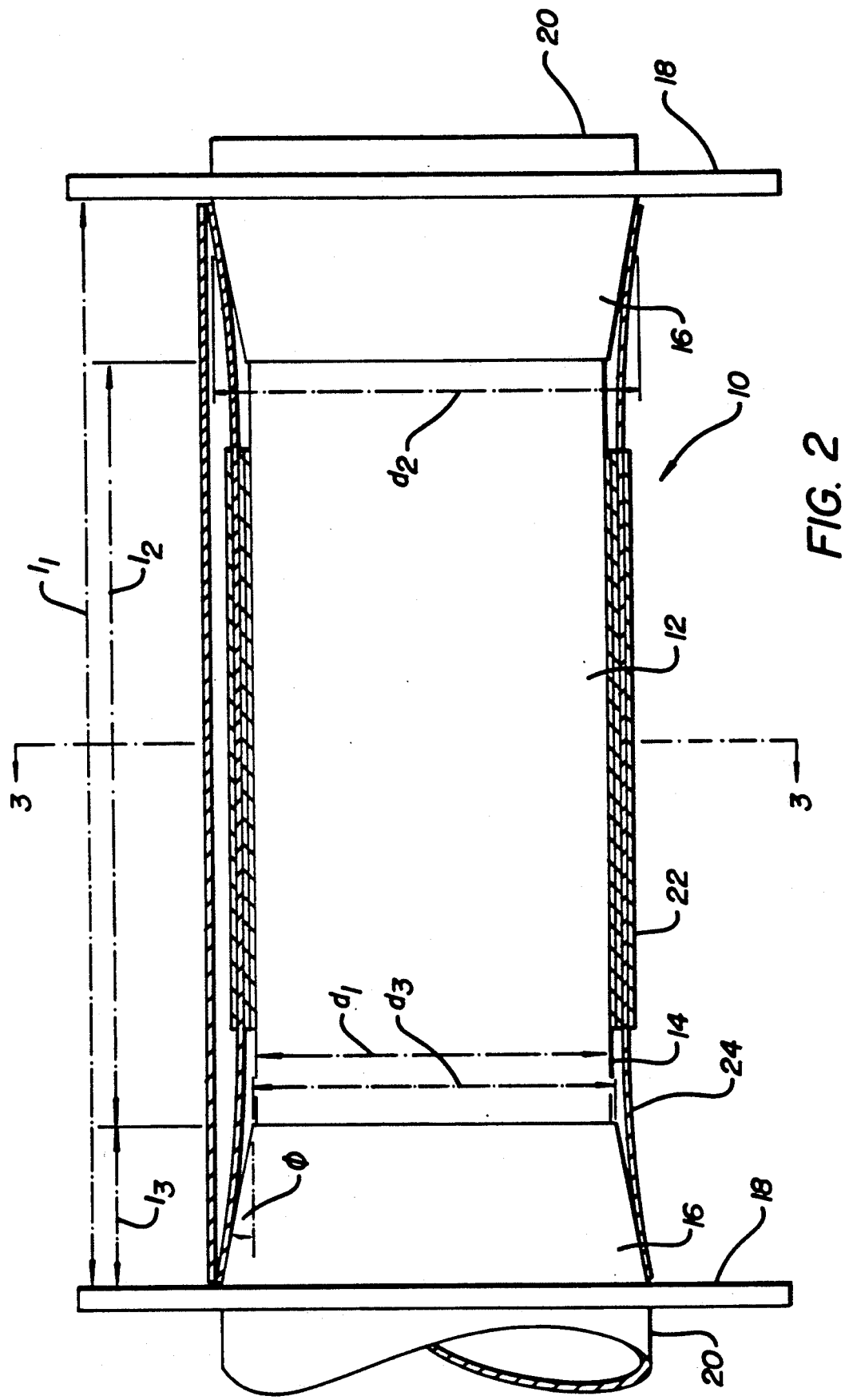
FIG. 2 shows an elevation view, partially in section, of a wound spool in accordance with the invention with a strip of photographic film attached by a strip of tape, with the first and part of the second convolution wound onto the core, taken along line 2—2 of FIG. 3.

A strip of tape 22 is used in the known manner to attach to spool 10 a strip of web material, such as a strip 24 of photographic film having a lead end with longitudinally extending edges and a transverse edge 26. Strip 22 is extended or wrapped more or less symmetrically about core 12 with its free ends projecting radially as shown in FIG. 1, after which transverse edge 26 is positioned between such free ends; and, using known apparatus, the tape is pressed into engagement with both sides of strip 24 to complete the attachment. Typically transverse edge 26 is positioned quite close to core 12 when the tape is pressed into engagement with strip 24. The spool is then rotated to wind strip 24 onto core 12. As the winding proceeds, one of the free ends of strip of tape 22 is folded back on itself. As a result, over a substantial portion of its length the first convolution of tape and film comprises an inner, double thickness of tape; a central, single thickness of film; and an outer, single thickness of tape, as seen in FIGS. 2 and 3. Thus, when the second convolution of film begins, it must pass over a radially outwardly and axially extended step or protrusion formed right at transverse edge 26. In known types of spools not provided with shoulders 16, contact with this protrusion or with the edges of the tape, or both, can cause deformations in the second convolution and to some extent in successive convolutions, which can lead to unacceptable pressure marking.

In accordance with the invention, as illustrated in FIG. 2, the axial length $l_3$ and cone angle $\phi$ of shoulders 16 are chosen so that, for a strip 24 having a width slightly less than $l_1$ and a given thickness and for a tape 22 having a given width less than $l_2$ and a given thickness, the first convolution of strip 24 about core 12 will bow radially inwardly toward core 12 during winding, even though the marginal edges of the first convolution of strip 24 are supported essentially at diameter $d_2$. This bowing is caused by the closeness of transverse edge 26 to core 12. That is, as shown in FIGS. 2 and 3, tape 22 tends to hold the central portion of transverse edge 26 near core 12 while the longitudinally extending marginal edges are at diameter $d_2$, thereby imparting a bowed configuration to at least that portion of the first convolution over which tape 22 extends. The second and successive convolutions, however, are not held by tape 22 and thus will extend essentially parallel to the axis of core 12 during winding, thereby radially spacing at least the axially central portion of the second convolution from the first convolution of strip 24 and strip of tape 22.

The invention may be used with web materials of many types which have the necessary flexibility to bow toward the core of the spool in the manner described. For conventional 35 mm photographic film, the thickness of the film typically is in the range of 0.0127 to 0.0203 mm. For a web of this width and thickness, diameter $d_1$ preferably should be in the range of 10.74 to 11.00 mm; diameter $d_2$, 12.77 to 13.03 mm; diameter $d_3$, 10.74 to 11.00 mm; length $l_1$, 35.10 to 35.36 mm; length $l_2$, 27.30 to 31.98 mm; length $l_3$, 1.78 to 3.81 mm; and angle $\phi$, 15° to 30°.

While our invention has been shown and described with reference to particular embodiments thereof, those skilled in the art will understand that other variations in form and detail may be made without departing from the scope and spirit of our invention.

Having thus described my invention in sufficient detail to enable those skilled in the art to make and use it, we claim as new and desire to secure Letters Patent for:

1. A wound spool of film, comprising:
   a film strip having a lead end with longitudinally extending edges and a transverse edge; and
   a spool comprising:
   a core;
   means for attaching said lead end to said core with said transverse edge close to said core;
   a pair of radially extended end flanges at respective opposite ends of said core;
   a pair of circumferentially and axially extended shoulders between said end flanges and said core for supporting at least a portion of said longitudinally extending edges of said lead end, said film strip being wound about said core;
   each of said shoulders having an axially extended frusto-conical portion adjacent to and extended from said end flange toward said core, each said frusto-concial portion having an axial length and a cone angle and being positioned for supporting one of said longitudinally extending edges of said lead end;
   said means for attaching, said axial length and said cone angle being sufficient for winding said lead end with said longitudinally extending edges supported on and about said frusto-conical portions and for causing a first convolution of said film strip to bow inwardly toward said core thereby radially spacing the first convolution from at least an axially central portion of a second convolution of said film strip.

2. A wound spool according to claim 1, wherein said means for attaching comprises a strip of tape extending around said core between said shoulders and engaging both sides of said lead end, said axial length and cone angle being sufficient for radially spacing said second convolution from contact with said strip of tape.

* * * * *